United States Patent [19]

Sander

[11] Patent Number: 4,629,647
[45] Date of Patent: Dec. 16, 1986

[54] EMBOSSING FOILS WHICH CAN BE WRITTEN UPON

[75] Inventor: Helfried Sander, Nuremberg, Fed. Rep. of Germany

[73] Assignee: Leonhard Kurz GmbH & Co., Fed. Rep. of Germany

[21] Appl. No.: 734,794

[22] Filed: May 16, 1985

[30] Foreign Application Priority Data

Jun. 20, 1984 [DE] Fed. Rep. of Germany ....... 3422908

[51] Int. Cl.⁴ ............................................... B32B 3/00
[52] U.S. Cl. .................................... 428/172; 156/233; 156/235; 156/239; 156/240; 428/201; 428/206; 428/207; 428/209; 428/692; 428/913; 428/914; 428/915; 428/916
[58] Field of Search ............... 156/233, 235, 239, 240, 156/241; 428/172, 201, 204, 206–209, 211, 692, 694, 913–916

[56] References Cited

U.S. PATENT DOCUMENTS

| 4,223,057 | 9/1980 | Rejto ................................. 428/172 |
| 4,463,034 | 7/1984 | Tokunaga et al. ................... 428/694 |
| 4,503,110 | 3/1985 | Skene ................................. 428/172 |

Primary Examiner—George F. Lesmes
Assistant Examiner—P. R. Schwartz
Attorney, Agent, or Firm—Louis E. Marn

[57] ABSTRACT

An embossing foil includes a signing layer which can be written upon, in conjunction with a layer having a structure giving an optical diffraction effect such as a hologram. The signing layer may be clear in the region over the diffraction structure or alternatively the signing layer, over the diffraction structure, may be of a patterned or grid configuration defining openings through which the structure therebeneath can be viewed. The foil may also include a magnetic layer for the storage of variable data which can be readily accessed.

15 Claims, 2 Drawing Figures

EMBOSSING FOILS WHICH CAN BE WRITTEN UPON

BACKGROUND OF THE INVENTION

The invention relates generally to embossing foils and more particularly to hot embossing foils.

Credit cards, cheque cards and similar items such as passes and identification documents usually have an area thereon for receiving the signature of the person holding the card. The signature area or panel is normally white or tinted and may be provided with an imprint of specific configuration. As will be readily appreciated, an important consideration in that respect is that it is possible easily to write on the signature area. In order to ensure that the signature on such a card cannot be subjected to manipulation for the purposes of forging the card with consequential improper use thereof, the signature area or the imprint frequently include substances which are added thereto and which, in the event of interference with the signature on the signature area, react by undergoing a change in colour, for example by fading out, by going to a dark colour or by experiencing colour reversal. The signature area is so designed as to reveal attempts at erasing the signature thereon, by the background of the signature panel changing colour in the event of the signature being erased. In spite of those measures which require some really complicated and expensive compositions for forming the signature panel as well as complicated methods of applying same, the degree of security against forgery and counterfeiting still leaves something to be desired.

SUMMARY OF THE INVENTION

An object of the present invention is to provide an embossing foil such as a hot embossing foil which can be satisfactorily written upon.

Another object of the present invention is to provide an embossing foil which, while it can be written upon in the usual fashion, is still substantially resistant to forging.

Yet another object of the invention is to provide a hot embossing foil which does not require particular operations or devices for application of the foil.

A further object of the invention is to provide an embossing foil which combines a surface which can be written upon as well as a holographic structure, for data recording purposes, affording a high degree of protection from forging.

Still a further object of the invention is to provide an embossing foil affording the combination of a signing area and a structure affording a holographic effect, which is of an attractive and attention-gaining effect.

In accordance with the present invention, these and other objects are attained by an embossing foil such as a hot embossing foil which comprises a backing foil and a transfer layer which is adapted to be removed therefrom and which comprises at least one layer of lacquer which can be written upon, thus forming a layer that may be referred to as a signing layer, which layer of lacquer forms the exposed surface of the foil after embossing and stripping away of the backing foil. On its side which is remote from the backing foil, the transfer layer may include an adhesive layer for securing it to a substrate. In addition, on the side of the above-mentioned signing layer, which is remote from the backing foil, the transfer layer includes at least one diffraction layer for receiving a structure having an optical diffraction effect, for example a holographic effect. The signing layer has the above-mentioned lacquer which can be written thereon, only in a region-wise manner, being of such a configuration that said structure is recognisable from the side of the signing layer.

Therefore, the foil in accordance with the principles of the present invention includes not only a surface which can be written upon, as for forming a signature thereon, but also a structure which has an optical diffraction effect, more particularly a holographic effect. The use of such a structure which may be really complicated and which often cannot be altered without damaging it or destroying it gives a high level of safeguard against forgery, more particularly by means of an authenticity feature which can be visually recognised or which may be visible only under certain conditions of lighting, such as a hologram; the structure involved will be such that it is very difficult to imitate it. A further advantage in this respect is that such structures which have an optical diffraction effect can normally be recognised not only visually but also by machine reading so that it is easily possible to establish whether a card or the like document bearing the foil is or is not genuine, by means of a suitable reading device. However, it should be noted that the combination of an area or panel which can be written upon, together with a structure having an optical diffraction effect, does not just provide for an improvement in the degree of safeguard against forgery. In addition, the use of holograms makes it possible to achieve a particularly elegant and attractive appearance, and the fact that the visible image of the structure or hologram is dependent on the angle at which it is viewed may have the result of particularly arousing an interest on the part of the person looking at the foil so that the advertising effect of credit cards, tickets and the like, which is beyond dispute, may be considerably increased by using a foil in accordance with the invention, in place of conventional signature foils.

The above-mentioned lacquer which can be written upon, for forming the signature area or panel, may be applied to the embossing foil in a region-wise manner by the regions of the signing layer which can be written upon, and the structure which produces the optical diffraction effect, being disposed in surface portions of the foil, which are suitably distinguished from each other, that is to say, there is a clear demarcation between the regions which can be written upon and the regions bearing the diffraction-effect structure. In that case, besides a signature area or panel, the embossing foil includes one or more diffraction images which are formed by the diffraction-effect structures.

It may frequently happen however that there is not a great deal of space for the signature panel or area and for applying additional identification characters. In that case, in accordance with a preferred embodiment of the invention, the embossing foil is preferably such that the regions of the signing layer which can be written upon are disposed in a pattern-like or grid-like configuration in such a manner that they cover the diffraction structure in a pattern-like or grid-like configuration, and the structure can only be recognised at the locations corresponding to the spaces defined by the grid-like configuration. Therefore, the foil of such a configuration, between the diffraction layer and the backing foil, only has a grid-like design defined by the lacquer forming the signing layer, so that the diffraction layer can still be seen through the spaces defined by the grid-like pattern. On the one hand, that ensures that it is readily possible to write on the signature area over the entire surface and extent thereof. On the other hand however, it is still possible to see and recognise the hologram or other such structure, more specifically because it is possible for example with holograms and other specific diffraction-effect structures for them to be such that they still supply all the information that they contain, even when a part thereof is covered or masked. That is because each element of the surface of the diffraction structure is capable of supplying the whole of the items of information stored in the structure, although obviously in that case with a reduced signal-noise ratio. The diffraction layer may be covered by the signing layer in a grid-like configuration in various forms, for example by a dot grid or pattern, a line grid or in the form of a character of quite specific configuration.

As will be appreciated, the fact that the above-mentioned signing layer is applied only to limited surface portions of the foil would have the result that the free surface of the foil, after removal of the backing foil, would be uneven, which is undesirable. To prevent that from occurring, the invention proposes in a preferred embodiment that the surface portions of the signing layer, which are between the portions which can be written upon, comprise a clear lacquer of suitable thickness, for the purposes of forming a flat and even surface. The clear lacquer does not interfere with readability of the diffraction-effect structure. It is particularly advantageous in that respect for the layer of clear lacquer to be formed by a release or peel-off lacquer as in that case there is no need to provide a separate separation or release layer between the backing foil and the signing layer. Furthermore, a construction of that nature has the advantage that under certain circumstances the signing layer comes away from the backing foil less easily than the clear lacquer, with the result that the signing layer tears when the backing foil is removed, thus imparting a roughness to the surface of the signing layer, to an extent which is sufficient to facilitate writing thereon.

In accordance with a further embodiment of the invention, the diffraction layer is formed by a layer of lacquer into which the optical diffraction-effect structure is embossed. That configuration makes it possible for the foil to be of comparatively small thickness. In addition, for the purposes of producing such foils, no additional working operation is required, besides the embossing operation. When the above-mentioned structure is formed on the side of the diffraction layer which faces away from the signing layer, there is the further advantage that said structure is still protected after the foil has been embossed in position, and the foil has a satisfactory, smooth surface.

Particularly when the structure is to be visible with the naked eye, it is desirable for the diffraction layer, on the side which faces away from the backing foil, to have a metal layer with the diffraction-effect structure. The metal layer is desirably a layer comprising aluminium or an aluminium alloy, which is applied for example by vapour deposit. Applying a metal layer of that kind generally results in the optical-effect structure being of improved visibility. On the other hand, such a metal layer can also produce further effects in regard to the appearance of the document or card which is to be safeguarded, and that is a consideration of significance in regard to the advertising effect as well as certain areas of use. In that connection, the metallisation layer may be applied only after the diffraction structure has been suitably formed in the layer of lacquer. However, it would also be possible for the diffraction structure not to be directly embossed into the respective layer of lacquer, but for the metal layer to be applied first of all, with the diffraction structure then being embossed into the metal layer.

Frequently, for example in regard to credit cards and cheque cards, it may be desirable to be able to provide same with additional items of information, for example concerning the state of the account to which the card relates, which information is to be variable. In order to provide for that effect, the invention proposes a further development in respect of the embossing foil in accordance with the principles of the invention, whereby the transfer layer, on the side of the diffraction layer which is remote from the carrier foil, has a magnetic layer comprising a dispersion of magnetisable particles in a binding agent. That then provides an embossing foil such as a hot embossing foil which on the one hand permits variable data, for example in regard to the state of an account and the like, to be stored in the magnetic layer, while on the other hand readily permitting a document to bear security features which are invariable, more specifically by virtue of the diffraction-effect structure, and finally also permitting the holder of the card to apply his or her signature thereto in a substantially forgery-proof manner. If, with the embossing foil in accordance with the invention, an attempt is made to alter the diffraction-effect structure on the foil once it has been set in position, or to change the signature on the foil, that would generally result in the diffraction-effect structure being damaged or destroyed, and possibly also would involve damge to the magnetic layer. However, in spite of the inclusion of a signing layer and a diffraction-effect structure, the foil in accordance with the teachings of this invention may still be of such a nature that the layers over the magnetic layer are so thin that the signal generated from the magnetic layer complies with the relevant standards in that respect. The admissible thickness of the diffraction layer or the signing layer essentially depends on the magnetic properties of the magnetic layer and more particularly the nature, state of dispersion, orientation relationship, level of pigmentation and thickness of the magnetic layer, and obviously also the magnetic pigment used. As the diffraction layer and the signing layer may both be comparatively thin, it is possible to employ the normal, comparatively thin metal layers which are less than 10 $\mu$m in thickness, and that aspect has in particular advantageous consequences in regard to the workability and handleability of the foil as well as the properties thereof, for example in regard to cohesion of the layers. Furthermore, the use of an embossing foil in accordance with the present invention as a magnetic foil has the advantage that, after the foil has been set in position, it has a very smooth surface as the smoothness of the surface of the embossed foil depends on the surface smoothness of the backing foil. If for example the backing foil is formed by a polyester film, it can be assumed that the degree of surface roughness thereof is less than 1 $\mu$m so that the quality of the embossed surface, with a satisfactory embossing tool, is far superior to the required standard of a mean value of roughness of a maximum of 2.5 $\mu$m. In addition, the fact that the diffraction layer, the signing layer and the magnetic layer are bound into a single embossing foil has the great advantage over the idea, which is perfectly feasible, of separately applying the various layers, that it is substantially more difficult to remove individual layers and thus to forge the card or document, when using the foil in accordance with the present invention. In addition, it will be appreciated that the teaching of the present invention also provides advantages from the manufacturing and processing points of view as the fact that the authenticity character or symbol is combined with the signing area or panel and possibly a carrier means for carrying variable data, in a single foil, means that only one working operation is now required for applying the embossing foil, whereas hitherto application of the foil required a number of different processes to be carried out. Moreover, when the embossing foil includes a magnetic foil, besides the diffraction-effect structure, a particularly high degree of safeguard against forging can be achieved if the data stored in the magnetic layer is adapted to the optical diffraction structure in a certain manner, that is to say, if there is a given association therebetween. In such a case, falsification for example of the data in the magnetic layer can then be very quickly detected. Furthermore, it is possible in principle for the same data to be stored in the magnetic layer and in the diffraction layer, in which case simple comparison between the sets of stored data can show whether falsification has or has not occurred.

In accordance with a preferred embodiment of the invention, it is possible for the signing layer and/or the diffraction layer and/or the magnetic layer and/or the clear lacquer layer to be coloured in order thereby to produce particular optical or decorative effects.

In producing the embossing foils according to the present invention, the layers of lacquer may be applied by means of the various processes which are known per se in connection with the manufacture of embossing foils, depending on the viscosity of the lacquer used and the thickness of the respective layers, for example by means of pattern rollers (intaglio printing), rollertype squeegee or doctor, reverse roller process, casting, and so on.

The metallisation operations may also be carried out using known processes which operate without pigment, for example vacuum vapour deposit or cathode ray sputtering.

Further objects, features and advantages of the invention will be apparent from the following description of two preferred embodiments of hot process embossing foils according to the invention.

DESCRIPTION OF PREFERRED EMBODIMENTS

Figure 1:
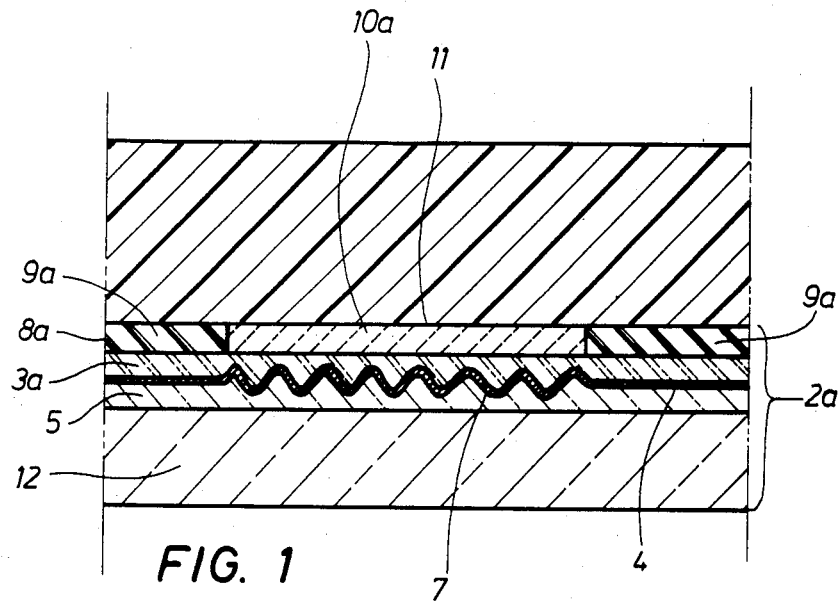
FIG. 1 shows a view in section through an embossing foil having a signing layer and a diffraction layer, wherein the regions which can be written upon or likewise marked are completely distinguished from the regions of the optical diffraction-effect structure.

Referring to the drawings, shown therein are embodiments of embossing foils which each include a carrier or backing foil 1 which is for example about 19 μm in thickness and which may comprise any suitable material such as polyethylene glycol terephthalate. Applied to the backing foil 1 as by a printing process is a transfer layer 2a (FIG. 1) or 2b (FIG. 2) which can be released from the backing foil. The difference between the foils shown in FIGS. 1 and 2 respectively lies in the nature of the respective transfer layers 2a and 2b.

Referring firstly to FIG. 1, starting from the backing foil 1, the transfer layer 2a comprises a surface layer of lacquer 8a which, after the embossing foil has been applied and the backing foil 1 has been peeled off, forms the free surface 11. The surface 11 is substantially flat, and forms the area or panel to which writing or other marking such as a signature is to be applied, the layer 8a therefore also being referred to hereinafter as the signing layer. The signing layer 8a is then followed by a layer of lacquer 3a which forms the diffraction layer, that is to say, it is intended to receive the structure 7 which has an optical diffraction effect. Adjoining the diffraction layer 3a is a thin metal layer 4, an adhesive layer 5 and the adhesive layer of lacquer 12 which serves to secure the foil to the substrate to which it is to be applied. The thicknesses of the respective layers are not shown true to scale. For example, where the backing foil 1 is formed by a polyester film, the thickness thereof may be from 10 to 25 μm, preferably around 19 μm. The layer 8a is applied in a thickness of from 1.5 to 3 μm, while the thickness of the diffraction layer 3a is for example about 0.8 to 2 μm. The metal layer 4 is applied by vacuum deposit and is for example from 0.01 to 0.04 μm in thickness. The thickness of the layer 5 is for example from 0.2 to 0.7 μm, while finally the thickness of the adhesive layer 12 may be from 1.5 to 4 μm.

The structure 7 is shown as being of a wavy or corrugated configuration in FIG. 1, for the sake of simplicity. The structure 7 is for example a diffraction structure having a holographic effect, the configuration thereof being in actual fact substantially more complicated.

As can be also clearly seen from FIG. 1, the signing layer 8a comprises a plurality of regions which are clearly distinguished from each other. Such regions comprise on the one hand a lacquer 9a which includes a pigment which, after release and removal of the backing foil 1, that is to say, after the embossing foil has been applied to the substrate to which it is to be secured, gives a rough surface and a degree of absorption capability which is sufficient to permit writing to be satisfactorily applied thereto. However, the lacquer 9a is present only in those regions in which there is no structure 7.

On the other hand, in the regions of the layer 8a which are disposed over the structure 7, the signing layer comprises a transparent or clear lacquer as indicated generally at 10a in FIG. 1, which on the one hand makes it possible for the structure 7 to be readily seen from the side of the backing foil 1, that is to say, when viewing on to the signing layer. On the other hand, the lacquer used for forming the region 10a is usually a lacquer which easily comes away from the backing foil 1 so that as a result there is no need to use a special separation agent between the layer 8a and the backing foil 1. The thicknesses of the layer of lacquer 9a which can be written upon, and the layer of clear lacquer 10a are approximately the same so that they provide a substantially flat surface as indicated at 11, as already mentioned above.

The compositions of the individual layers of lacquer are as follows: Lacquer A (lacquer 9a which can be written upon):

| Component | Parts by wt |
| --- | --- |
| PVC/PVac copolymer | 4000 |
| Nitrocellulose | 2000 |
| Oil-free alkyd | 50 |
| Flow agent | 800 |
| Dioctyl phthalate | 500 |
| Methyl ethyl ketone | 25000 |
| Toluene | 2000 |
| Ethyl acetate | 2000 |
| Cyclohexanone | 1000 |
| Diacetone alcohol | 1000 |
| Titanium dioxide (rutile) | 20000 |
| Lubricant | 1000 |

Lacquer B (clear lacquer 10a):

| Component | Parts by wt |
| --- | --- |
| High molecular PMA-resin | 2000 |
| Polyethylene in finely dispersed form | 100 |
| Silicone alkyd oil-free | 300 |
| Non-ionic wetting agent | 50 |
| Nitrocellulose | 750 |
| Methyl ethyl ketone | 12000 |
| Toluene | 2000 |
| Diacetone alcohol | 2500 |

Lacquer C (diffraction layer 3a):

| Component | Parts by wt |
| --- | --- |
| Methyl-/n-butyl-methacrylate | 1000 |
| Low-viscosity nitrocellulose | 1000 |
| Phenol-modified colophony | 500 |
| Methyl ethyl ketone | 4000 |
| Toluene | 3000 |
| Ethyl acetate | 1500 |
| 98/100 butyl acetate | 3000 |

Lacquer D (adhesive layer 5):

| Component | Parts by wt |
| --- | --- |
| High-molecular PMMA-resin | 1200 |
| Methyl ethyl ketone | 3400 |
| Toluene | 1000 |
| Matting agent | 100 |

Lacquer E (layer 12):

| Component | Parts by wt |
| --- | --- |
| Nitrocellulose | 4000 |
| Polyurethane, low-viscosity | 1000 |
| Methyl ethyl ketone | 25000 |
| Toluene | 2000 |
| Ethyl acetate | 2000 |

The procedure for producing the foil shown in FIG. 1 is as follows:

Taking the backing foil 1, being a polyethylene glycol terephthalate foil of from 19 to 23 $\mu$m in thickness and preferably about 19 $\mu$m, the lacquers A and B are applied by printing in a dual-roller printing machine with a high degree of register accuracy, using two intaglio printing pattern rollers, with the lacquers being in a condition of precise and close interengagement with each other to form the portions 9a and 10a respectively. The lacquers are applied in a weight of 2.5 g/m² in regard to the lacquer A and 4.8 g/m² in regard to the lacquer B. The lacquers are dried at around 120° C. The lacquer C is then applied by means of a line-grid intaglio printing roller and with a weight of about 2.2 g/m², and dried at a temperature of 120° C.

The structure 7, being in this case a hologram, is then embossed into the layer 3a of lacquer, at a temperature of about 130° C., by means of a die which comprises for example nickel. That operation is effected at different times depending on the formula of the lacquer used for producing the layer 3a. Following the operation of forming the structure 7, the layer of lacquer 3a is set by cross-linking or in some other fashion.

For the purposes of producing the structure 7, the die is preferably electrically heated. Before the die is lifted away from the lacquer 3a after the operation of producing the structure 7, the die may be cooled down again.

As soon as the structure 7 has been formed and the layer of lacquer 3a is sufficiently hard, aluminium is applied by vapour deposit to the layer 3a, under a pressure of about $10^{-4}$ Torr, with the thickness of the applied layer being about 200 Å $10^{-10}$.

The layer 5 comprising the lacquer D is then applied to the metal layer 4, with an applied weight of about 0.4 g/m2, followed finally by the adhesive layer 12 comprising the lacquer E, which is applied in a weight of about 1.2 g /m².

Under some circumstances, it may be possible to omit the adhesive layer 12 if the layer of lacquer 5 is of a suitable composition.

Figure 2:
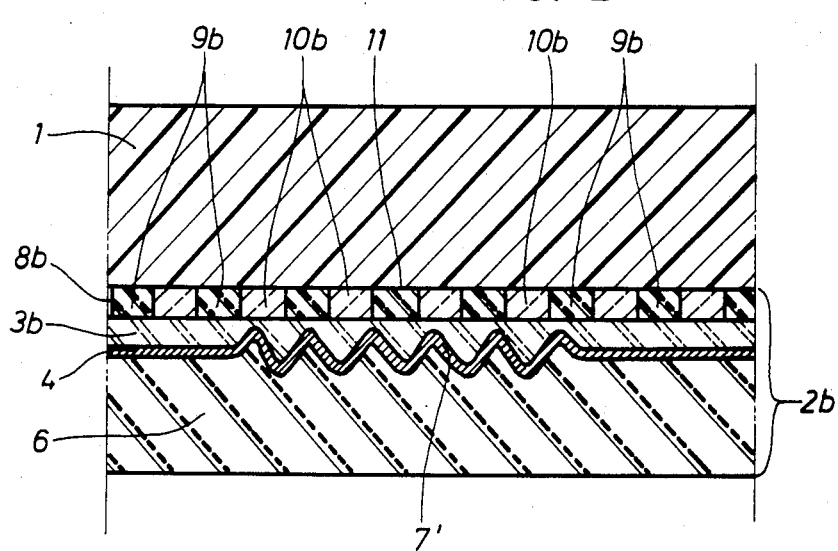
FIG. 2 shows a view in section through a hot embossing foil with a magnetic layer, a diffraction layer and a signing layer, wherein the signing layer covers over the diffraction layer.

Reference will now be made to a second embodiment of the present invention, as shown in FIG. 2, wherein the embossing foil comprises a transfer layer 2b which, like the transfer layer 2a of the embodiment shown in FIG. 1, comprises a signing layer 8b which can be written upon or likewise marked, and a layer for diffraction 3b with a structure 7' having an optical diffraction effect. However, there are two major differences between the foil shown in FIG. 1 and the foil shown in FIG. 2, namely that the signing layer 8b in FIG. 2 also has regions comprising an absorbent, pigmented lacquer 9b which can be written upon, in the region of the structure 7', and on the other hand, the foil shown in FIG. 2 is additionally provided with a magnetic layer 6.

The signing layer 8b in the foil shown in FIG. 2 is of such a configuration that, in spite of the presence of regions 9b of lacquer which can be written upon, over the structure 7', that structure is still visible from the side at which the backing foil 1 is disposed.

Like the layer 8a of the embossing foil shown in FIG. 1, the signing layer 8b in FIG. 2 comprises two different lacquers 9b and 10b, wherein the non-transparent lacquer 9b which forms the lacquer which can be written upon is applied in a grid or pattern-like configuration, for example in the form of a dot pattern or grid, a bar or line pattern or grid, and so forth. The lacquer 10b is transparent or translucent and is provided in each of the spaces defined between the regions covered with the lacquer 9b. As can be clearly seen from FIG. 2, the lacquer 9b which can be written upon and the clear lacquer 10b which fills the intermediate spaces are of approximately the same thickness so that the overall layer formed thereby has a generally flat and even surface 11, towards the backing foil 1.

In spite of the presence of the non-transparent lacquer 9b in the layer 8b, in the regions over the structure 7', the structure 7' can still be read, particularly if it is a hologram, even if with a poorer signal-noise ratio, as holograms afford the possibility of storing all the items of information in each and every region thereof.

The lacquers used in the embodiment shown in FIG. 2 are as follows:

Lacquer F (transparent lacquer 10b):

| Component | Parts by wt |
| --- | --- |
| High-molecular PMMA-resin | 2000 |
| Silicone alkyd, oil-free | 300 |
| Non-ionic wetting agent | 50 |
| Low-viscosity nitrocellulose | 750 |
| Methyl ethyl ketone | 12000 |
| Toluene | 2000 |
| Diacetone alcohol | 2500 |

Lacquer G (Lacquer 9b):

| Component | Parts by wt |
| --- | --- |
| PVC/PVac copolymer | 4000 |
| Low-viscosity nitrocellulose | 2000 |
| Oil-free alkyd | 50 |
| Silicone polyester resin | 2000 |
| Flow agent | 800 |
| Dioctyl phthalate | 500 |
| Methyl ethyl ketone | 25000 |
| Toluene | 2000 |
| Ethyl acetate | 2000 |
| Cyclohexanone | 1000 |
| Diacetone alcohol | 1000 |
| Calcium carbonate | 25000 |

Lacquer H (diffraction layer 3b):

| Component | Parts by wt |
| --- | --- |
| Methyl/n-butyl-methacrylate | 1000 |
| Low-viscosity nitrocellulose | 1000 |
| Phenol-modified colophony | 500 |
| Methyl ethyl ketone | 4000 |
| Toluene | 3000 |
| Ethyl acetate | 1500 |
| 98/100 butyl acetate | 3000 |

Magnetic layer 6:

This layer comprises a dispersion of needle-like $\gamma$-$Fe_2O_3$ magnetic pigment in a polyurethane binding agent, various lacquer additives and a solvent mixture comprising methyl ethyl ketone and tetrahydrofuran. Such magnetic dispersions are known per se.

The operating procedure for manufacturing the foil shown in FIG. 2 is as follows:

Using a two-colour printing machine with a degree of register inaccuracy of less than 0.05 mm, with two intaglio printing pattern rollers, the lacquers F and G are applied by printing in a condition of precise and close interengagement with each other to a polyethylene glycol terephthalate foil which is 19 $\mu$m in thickness. The lacquers F and G are initially produced in compliance with the above-mentioned requirements, but with a reduced solvent content, and then after test printing are diluted down to such a degree that the dry layer thickness in respect of the two lacquers is just of the same magnitude, being about 1.5 $\mu$m. That thus produces on the foil 1 a continuous signing layer 8b of substantially uniform thickness, which is made up of regions 9b of the signable lacquer G and other regions 10b formed by the lacquer F. At the same time, the lacquer F has the property of easily coming away from the backing foil 1 while the lacquer G possibly clings to the backing foil 1 so that, when the backing foil 1 is peeled off, the lacquer G tears away at its surface, thus providing a rough surface to which writing can be more readily applied.

Subsequently to the operation of applying the lacquers F and G to the foil, the lacquer H is applied with a line pattern or grid intaglio printing roller, in a weight of about 1.2 g/m$^2$, and is dried at 120° C.

Then, as described above with reference to the embodiment illustrated in FIG. 1, the structure 7' is embossed or impressed into the lacquer H, and the metal layer 4 which comprises for example aluminium or an aluminium alloy is applied by vapour deposit. Then, in the same manner as described above with reference to FIG. 1, an adhesive layer of about 0.4 $\mu$m in thickness can be applied, although in the embodiment shown in FIG. 2, that layer has been omitted. The metal layer is then followed by a layer of the magnetic dispersion of the above-described composition, being about 9 $\mu$m in thickness.

The magnetic layer does not necessarily have to be of the above-indicated composition. Instead of the $Fe_2O_3$ pigment, it would also be possible to use for example other magnetic pigments, for example C -doped magnetic iron oxides or other finely dispersed magnetic materials (such as Sr or Ba-ferrite). The combination of binding agents of the magnetic layer may be different. As already mentioned, when using a suitable combination of binding agent, it may be possible to omit the adhesive layer in the embodiment shown in FIG. 1, because there is good direct adhesion between the magnetic layer 6 and the metal 4. It would be possible to use a hot-adhesive layer, and the choice of whether such a layer is or is not used depends on the composition of the substrate to which the foil is to be applied. If for example the substrate comprises PVC, as is generally the case with credit cards, it is normally possible to omit a special hot-adhesive layer.

Tests have shown that the foil illustrated in FIG. 2 complies with the requirements of the current standards relating to magnetic data carriers. More particularly, each embodiment provided adequate signal voltages and sufficient resistance to wear and abrasion.

It will be appreciated that the embodiments described hereinbefore have been set forth solely by way of example of the principles of the present invention and that other modifications and alterations may be made therein without thereby departing from the spirit and scope of the present invention.

What is claimed is:

1. An embossing foil comprising a backing foil having first and second surfaces, and on said first surface of said backing foil a transfer layer means which is releasable therefrom, said transfer layer means including a layer of lacquer which is adapted to be written upon thereby to constitute a signing layer, and which after removal of said backing foil is adapted to form the exposed surface of the embossing foil, the transfer layer means on the side of said signing layer remote from said backing foil further including a diffraction layer comprised, at least in part, of a protective lacquer, and having a portion thereof configured to provide a diffraction effect structure, said signing layer being of a configuration adapted to permit said diffraction effect structure to be recognisable from said exposed surface of the embossing foil.

2. An embossing foil as set forth in claim 1 wherein said signing layer is formed by first portions which are adapted to be written upon and second portions which are adapted to permit said diffraction effect structure to be recognisable through said signing layer.

3. An embossing foil as set forth in claim 2 wherein said second portions of said signing layer comprise clear lacquer of suitable thickness for forming a flat surface with said first portions.

4. An embossing foil as set forth in claim 3 wherein said clear lacquer is a release lacquer.

5. An embossing foil as set forth in claim 3 wherein said clear lacquer is coloured.

6. An embossing foil as set forth in claim 1 wherein said signing layer is provided in a grid-like pattern formed by portions that are adapted to be written upon and spaces between said portions, whereby said structure can be recognised only at said spaces defined by said grid-like pattern.

7. An embossing foil as set forth in claim 1 wherein on the side away from said backing foil said diffraction layer includes a metal layer disposed to include said portion of said diffraction layer configured to provide said diffraction effect structure.

8. An embossing foil as set forth in claim 7 wherein said metal layer is a layer of aluminum which is applied by vapour deposit.

9. An embossing foil as set forth in claim 7 wherein said metal layer is a layer of aluminum alloy which is applied by vapour deposit.

10. An embossing foil as set forth in claim 1 wherein on the side of said diffraction layer which is remote from said backing foil said transfer layer means includes a magnetic layer formed by a dispersion of magnetisable particles in a binding agent.

11. An embossing foil as set forth in claim 1 wherein at least one of said signing layer and said diffraction layer is coloured.

12. An embossing foil as set forth in claim 10 wherein said magnetic layer is coloured.

13. An embossing foil as set forth in claim 1 wherein said transfer layer means further includes on its side remote from said backing foil an adhesive layer adapted to secure said transfer layer means to a substrate to which is is to be applied.

14. An embossing foil comprising a backing foil having first and second surfaces, and on said first surface of said backing foil a transfer layer means which is releasable therefrom, said transfer layer means including a layer of lacquer which is adapted to be written upon thereby to constitute a signing layer, and which after removal of said backing foil is adapted to form the exposed surface of the embossing foil, the transfer layer means on the side of said signing layer remote from said backing foil further including a diffraction layer for providing a structure having an optical diffraction effect, said diffraction layer being comprised of a layer of lacquer into which said diffraction effect structure is embossed, and said signing layer being of a configuration adapted to permit said diffraction effect structure to be recognisable from said exposed surface of the embossing foil.

15. An embossing foil as set forth in claim 14 wherein said diffraction effect structure is embossed on the side of said diffraction layer which is away from said signing layer.

* * * * *